(12) United States Patent
Lindahl

(10) Patent No.: US 6,279,854 B1
(45) Date of Patent: Aug. 28, 2001

(54) COMBINED DAMPER AND TRUCK POSITIONER FOR LANDING GEAR

(75) Inventor: Gary M. Lindahl, Newcastle, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/302,233

(22) Filed: Apr. 29, 1999

(51) Int. Cl.$^7$ .................................................. B64C 25/22
(52) U.S. Cl. ................................. 244/104 FP; 244/100 R
(58) Field of Search ........................ 244/100 R, 104 FP, 244/102 SS; 188/316, 318

(56) References Cited

U.S. PATENT DOCUMENTS

| | | | |
|---|---|---|---|
| Re. 30,896 | * | 4/1982 | Jenkins et al. . |
| 2,579,180 | * | 12/1951 | Eldred . |
| 3,054,582 | | 9/1962 | Lucien . |
| 3,322,376 | * | 5/1967 | Neilson et al. . |
| 3,960,251 | * | 6/1976 | Gorissen . |
| 4,359,199 | | 11/1982 | Kramer et al. . |
| 4,595,159 | | 6/1986 | Hrusch . |
| 4,729,529 | | 3/1988 | Hrusch . |
| 4,749,152 | | 6/1988 | Veaux et al. . |
| 4,787,486 | | 11/1988 | Hrusch et al. . |
| 4,834,223 | | 5/1989 | Kawamura et al. . |
| 4,869,444 | | 9/1989 | Ralph . |
| 4,886,248 | | 12/1989 | Delahye et al. . |
| 4,892,270 | | 1/1990 | Derrien et al. . |
| 5,110,068 | * | 5/1992 | Grande et al. . |
| 5,275,086 | | 1/1994 | Stallings, Jr. . |
| 5,522,301 | * | 6/1996 | Roth et al. . |
| 5,682,980 | * | 11/1997 | Reybrouck . |
| 5,743,491 | | 4/1998 | Meneghetti . |
| 6,120,009 | * | 9/2000 | Gatehouse et al. . |

FOREIGN PATENT DOCUMENTS

| | | |
|---|---|---|
| 1 510 554 | 5/1978 | (EP) . |
| 597 689 A1 | 5/1994 | (EP) . |
| WO 99/47416 | 9/1999 | (WO) . |

* cited by examiner

Primary Examiner—Charles T. Jordan
Assistant Examiner—Tien Dinh
(74) Attorney, Agent, or Firm—Christensen O'Connor Johnson Kindness PLLC

(57) ABSTRACT

A combined hydraulic damper and truck positioner mechanism (20) for a landing gear (22) of an airplane. The landing gear being swingingly attached to the airplane for reciprocating movement of the landing gear between an extended position and a retracted position. The landing gear including an elongate main strut (24) having one end swingingly attached to the airplane and a longitudinally spaced second end (36). The landing gear further including a truck beam assembly (26) pivotally attached to the strut second end. The truck beam assembly having at least two wheels (30) journaled thereto. The combined damper and truck positioner mechanism including a housing (60) having one end (68) adapted to be fastened to the strut. The housing having an interior bore (66) with a predetermined cross-sectional area. The combined damper and truck positioner mechanism further including a piston (64) having a first piston head end (90) and a longitudinally spaced second end (112) adapted to be fastened to the truck beam assembly. The piston head being slidably received within the bore for sliding movement of the piston in response to pivoting movement of the truck beam assembly when the piston second end is attached to the truck beam assembly. The combined damper and truck positioner mechanism also including a damping assembly (54) in fluid communication with the housing. The damping assembly maintaining a substantially constant fluid pressure within the housing to dampen loads associated with the sliding movement of the piston when the landing gear is in the extended position.

16 Claims, 3 Drawing Sheets

COMBINED DAMPER AND TRUCK POSITIONER FOR LANDING GEAR

FIELD OF THE INVENTION

The present invention relates to aircraft landing gear and, more particularly, to a combined stiffness damper and truck positioner for landing gear.

BACKGROUND OF THE INVENTION

Landing gear for most commercial aircraft include a main shock strut having one end pivotably attached to a portion of the airplane for swinging movement of the landing gear between a retracted and extended position. The landing gear also includes a truck beam pivotably attached to the other end of the main shock strut. A plurality of wheels are journaled to the truck beam. It is desirable for the truck beam to be pivotably attached to the main shock strut to permit the beam to pivot and absorb energy associated with traversing a bump or a rough runway, as well as permitting the truck beam to be positioned for stowage within the airplane. Extending between the main shock strut and the truck beam is a hydraulic truck positioner. The truck positioner is adapted to position the truck beam for stowage within the airplane.

FIG. 1 illustrates a currently available truck positioner 10. The truck positioner 10 includes a cylindrical housing 12, a floating piston 14, a main piston 16 and a hydraulic system 18. For ease of illustration, the hydraulic system 18 is illustrated as a schematic. The main piston 16 includes a piston head end slidably received within the housing 12. The other end of the main piston 16 is pinned to the truck beam to enable positive positioning of the truck beam after take off, thereby ensuring safe retraction of the landing gear by positioning the wheels clear of adjacent wheel well structure and equipment during flight. The floating piston 14 allows extra extension of the actuator when hydraulic pressure is off, which is required for changing tires.

Thus, currently available truck positioners are hydraulic actuators designed to selectively pivot the truck beam about its pivot joint to position the truck beam into a desired predetermined stowage position.

Although currently available truck positioners are effective at positioning the truck beam for stowage within the aircraft, they are not designed to dampen loads associated with a pivotable truck beam. As noted above, the truck beam is designed to pivot about its pivot attachment joint. When traveling on rough runways, the truck beam becomes excited at its natural frequency, causing high frequency pivoting of the pivot beam. Such high frequency pivots result in premature failure of the pivot joint. In particular, investigation of failed pivot joints has indicated that such failures are caused by aggressive pivot pin rotation linked to rapid truck beam oscillations characteristic of rough runway operations. Further, certain airlines typically load their airplanes to their maximum capacity, thereby aggravating the adverse effects of rough runways on the highly loaded pivot joint.

Under such operating conditions, high frequency oscillations about the pivot joint causes the joint to overheat, adversely affecting the material's properties. As a result, such assemblies become hard and brittle and, therefore, susceptible to crack generation. Ultimately, such cracks cause premature failure of the pivot joint. Thus, there exists a need for a damping assembly to minimize the displacements of high frequency oscillations of a landing gear truck beam.

SUMMARY OF THE INVENTION

In accordance with the present invention, a combined damper and truck positioner mechanism for a landing gear of an airplane is provided. The landing gear is swingingly attached to the airplane for reciprocating movement between an extended position and a retracted position. The landing gear includes an elongate main strut having one end swingingly attached to the airplane and a longitudinally spaced second end. The landing gear further includes a truck beam assembly pivotably attached to the strut second end. The truck beam assembly has at least two wheels journaled thereto.

The combined damper and truck positioner mechanism includes a housing having one end adapted to be fastened to the strut. The housing includes an interior bore having a predetermined cross-sectional area. The combined damper and truck positioner mechanism also includes at least a first piston having a first piston head end and a longitudinally spaced second end adapted to be fastened to the truck beam assembly. The piston head is slidably received within the bore for sliding movement of the piston in response to pivoting movement of the truck beam assembly when the piston second end is fastened to the truck beam assembly. The piston head has a cross-sectional area substantially equal to the cross-sectional area of the bore to define first and second chambers on opposite sides of the piston head.

The combined damper and truck positioner mechanism also includes a damping mechanism in fluid communication with the first and second chambers of the housing. The damping mechanism maintains a substantially constant fluid pressure within both chambers to dampen loads associated with sliding movement of the piston when the landing gear is in the extended position.

In accordance with further aspects of this invention, the damping mechanism further includes a first channel in fluid communication with the first chamber and a second channel in fluid communication with the second chamber. The first and second channels are in fluid communication with the first and second chambers to dampen sliding motion of the piston within the housing by selectively maintaining the fluid pressure within the first and second chambers.

In accordance with other aspects of this invention, the damping mechanism further comprises at least a first one way relief valve in fluid communication with the first channel and a second one way relief valve in fluid communication with the second channel. The first and second relief valves provide an equal damping force in opposite directions through the damping mechanism.

In accordance with still other aspects of this invention, the combined damper and truck positioner mechanism further includes a pair of damping orifices disposed within the damping mechanism with pressurized fluid supplied between the two orifices. Each damping orifice is sized to preload both the first and second chambers to a predetermined fluid pressure.

A combined damper and truck positioner mechanism formed in accordance with the present invention has several advantages over currently available truck positioner mechanisms. First, the damping orifices preload both chambers to the nominal system pressure. This causes both chambers to react to the external load instead of each chamber alternately which is the case with unpressurized dampers. This preloading of both chambers doubles the stiffness of the damper which in turn allows for a much smaller size. Second, such an assembly may be fastened to the existing structural arrangement of the landing gear. As a result, such a mechanism may be easily incorporated on both new and existing landing gear assemblies. High frequency oscillations caused by traversing a rough runway are typically of small amplitude. Such small amplitude oscillations are very hard to damp out using conventional hydraulic dampers due to lack of stiffness and lack of space for a large damper. The combined damper and truck positioner of the present invention doubles the stiffness of the damper while preserving the truck positioning function. Finally, conventional dampers use a fixed volume of hydraulic fluid that is pumped alternately back and forth through an orifice. This leads to overheating because the energy dissipated through the orifice has no where to go. The present invention overcomes this problem by causing a small pumping action to occur that draws in from the supply and expels to the reservoir, a small amount of fluid with each damping cycle.

Thus, a combined damper and truck positioner mechanism formed in accordance with the present invention is economical, extends the useful life of landing gear assemblies and does not require alteration of existing structural arrangement of current landing gear assemblies.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
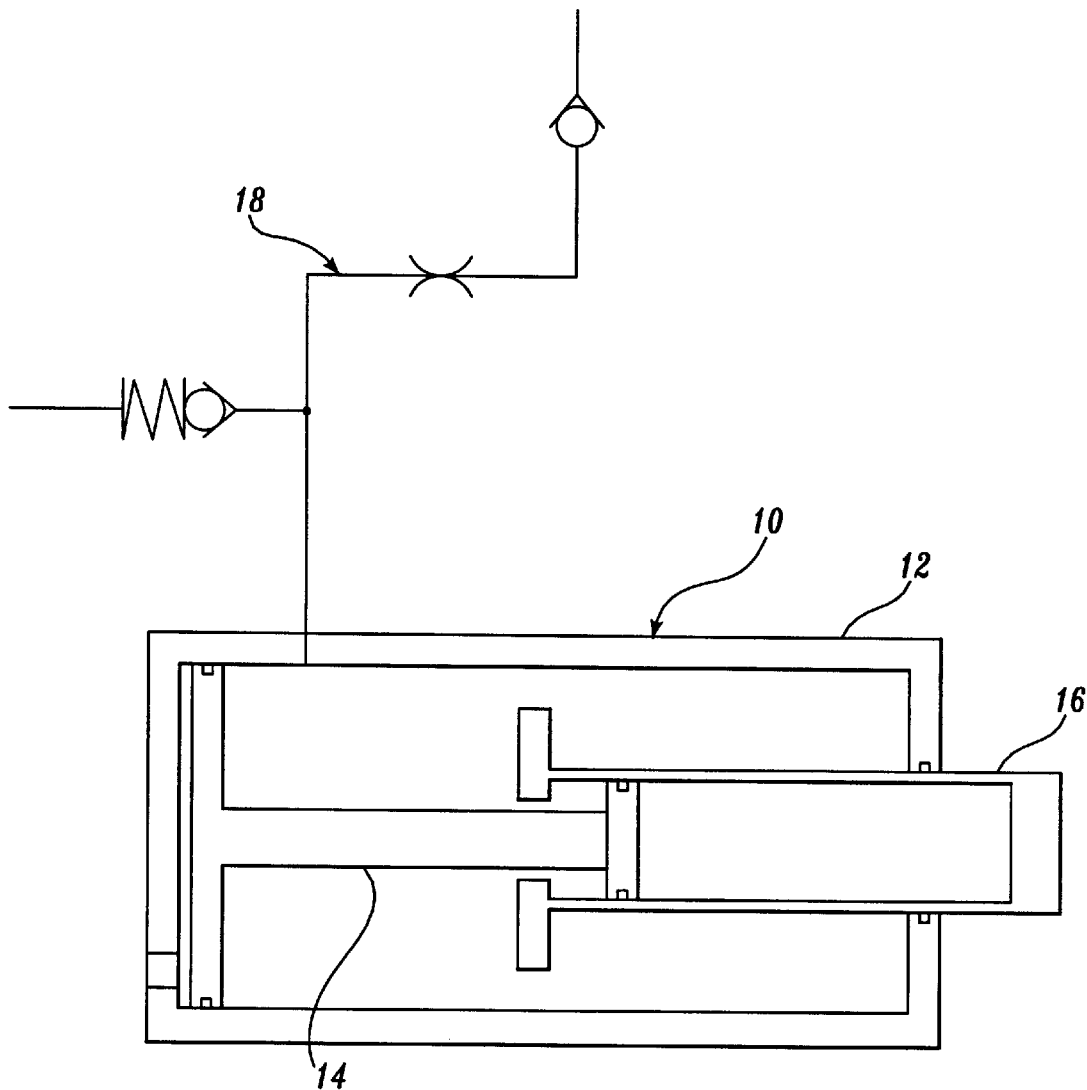
FIG. 1 is a schematic of a prior art hydraulic truck positioner mechanism for landing gear.
Figure 2:
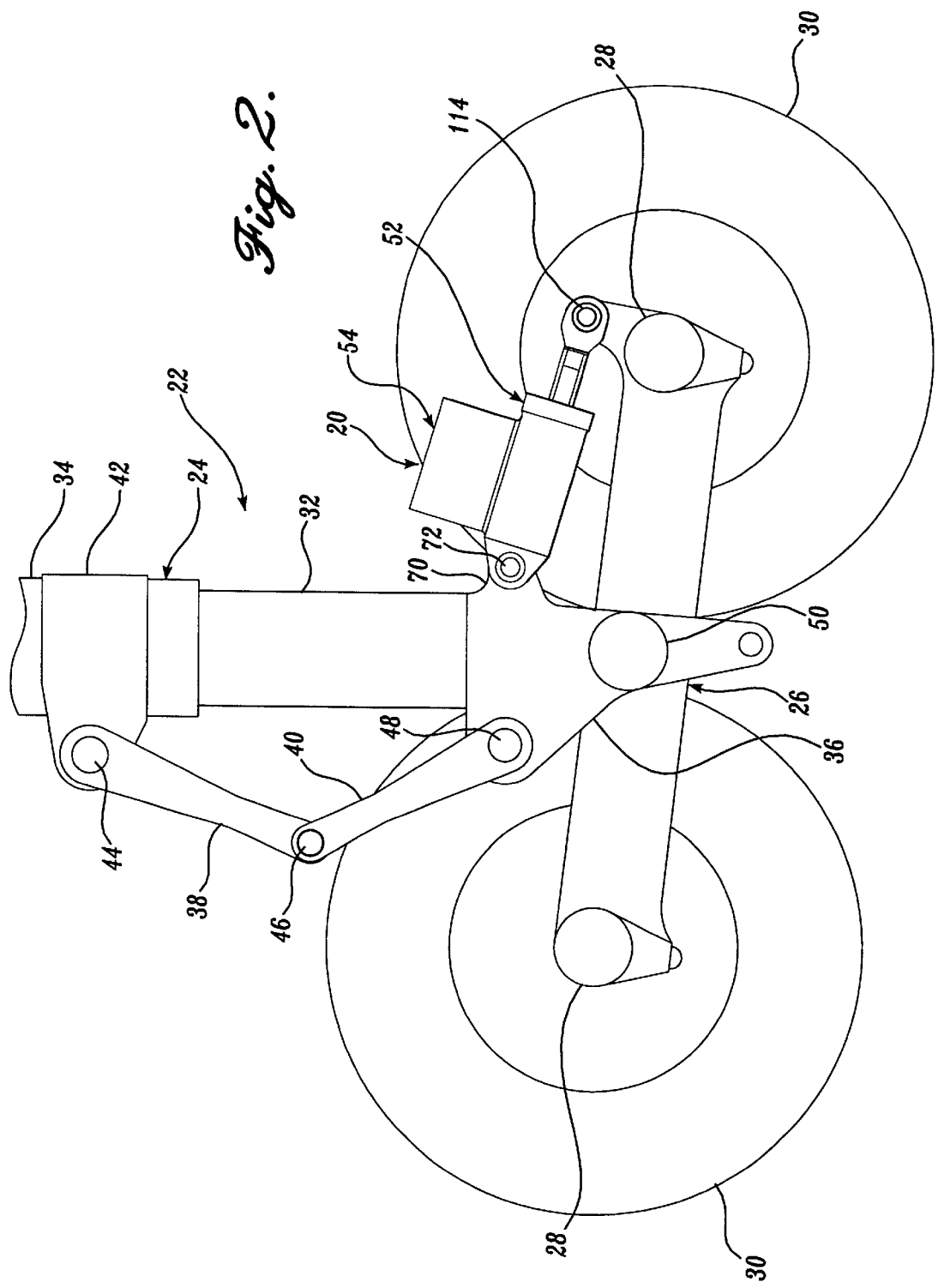
FIG. 2 is an environmental view of a combined hydraulic damper and truck positioner mechanism formed in accordance with the present invention as it would be attached to a landing gear assembly, wherein the landing gear assembly is shown in the extended position with wheels off the ground, and with one set of wheels removed for clarity.

FIG. 2 illustrates a preferred embodiment of a combined hydraulic damper and truck positioner mechanism 20 ("truck positioner mechanism 20") constructed in accordance with the present invention. The truck positioner mechanism 20 is shown pivotably attached to a landing gear assembly 22. As is well known, the landing gear assembly 22 may be swingingly attached to an airplane (not shown) for reciprocating movement between an extended position and a retracted position. The landing gear assembly 22 includes an elongate shock strut 24, a truck beam 26, a plurality of axles 28 and a plurality of wheels 30. For ease of illustration, only the inboard set of wheels 30 are illustrated. However, it should be apparent to one skilled in the art that such a landing gear assembly includes a second set of wheels positioned parallel to the first set of wheels. Additionally, although the landing gear assembly is illustrated as a four wheel truck, other landing gear assemblies, such as a six wheel truck, are also within the scope of the present invention.

The shock strut 24 includes telescoping inner and outer strut cylinders 32 and 34. The inner shock strut cylinder 32 is axially slidable within the outer cylinder 34. A shock absorber mechanism (not shown), such as an encapsulated shock absorber or oleo, is included inside the telescoping inner and outer cylinders 32 and 34 to dynamically react ground loads encountered during landing and taxiing of the airplane. The lower end of the inner cylinder 32 includes a bifurcated yoke 36. Rotation of the inner cylinder 32 with respect to the outer cylinder 34 is prevented by well known upper and lower torsion links 38 and 40.

One end of the upper torsion link 38 is pinned to the outer cylinder 34 by an attachment collar 42 and a well known fastener 44, such as a pin assembly. The other end of the upper torsion link 38 is pinned to one end of the lower torsion link 40 by a second well known fastener 46, such as a pin assembly. The lower end of the lower torsion link 40 is pinned to the forward end of the yoke 36 by a third well known fastener 48, such as a pin assembly. As assembled, the upper and lower torsion links 38 and 40 are foldably attached to the inner and outer cylinders 32 and 34 to resist rotation of the inner cylinder 32 relative to the outer cylinder 34.

The bifurcated portion of yoke 36 is sized to receive the truck beam 26 therein. The truck beam 26 is pivotably attached to the yoke 36 by a well known pivot joint assembly 50 to maintain the truck beam 26 parallel to the direction of travel of the airplane. The pivot joint assembly 50 permits the truck beam 26 to pivot about the pivot joint assembly 50 in response to a variety of conditions, such as ground loads encountered during taxiing of the airplane or positioning the truck beam 26 for stowage within the airplane. The wheels 30 are journaled in a well known manner to the truck beam 26 by the axles 28. Although a total of two sets of landing wheels are illustrated in the preferred embodiment, a landing gear assembly having more or fewer sets of wheels, such as four sets or a single set of wheels, is also within the scope of the present invention.

Figure 3:
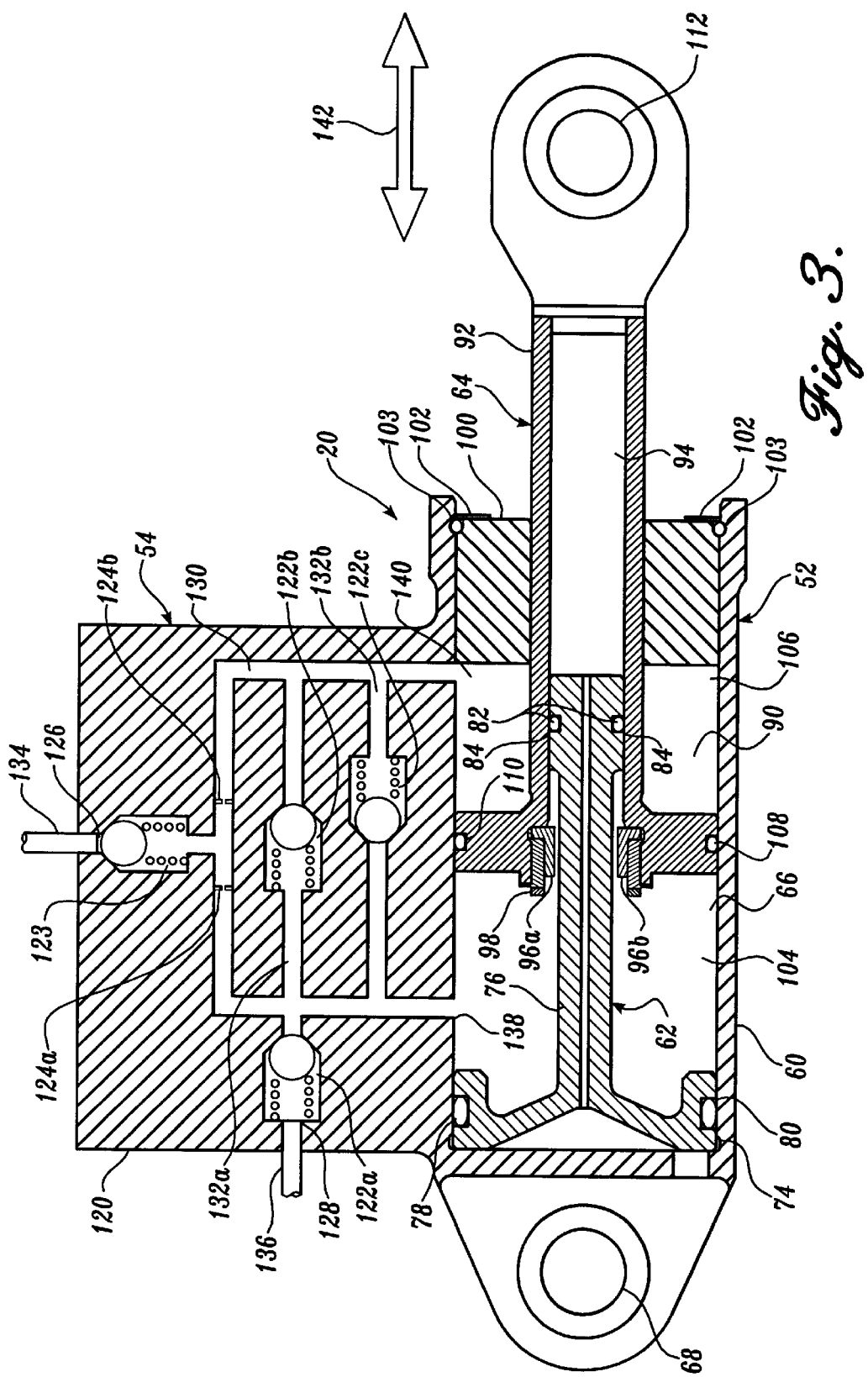
FIG. 3 is a cross-sectional side view of a combined hydraulic damper and truck positioner mechanism formed in accordance with the present invention showing the landing gear in the on-ground damping position and the major components of the truck positioner and damping mechanism.

As may be best seen by referring to FIGS. 2 and 3, the truck positioner mechanism 20 includes a truck positioner assembly portion 52 and a damping mechanism portion 54. The truck positioner assembly 52 includes an elongate housing 60, a floating piston 62 and a main piston 64. The housing 60 is suitably manufactured from a high strength material, such as steel, and includes a longitudinally extending internal bore 66. Integrally formed with one end of the housing 60 is an attachment bore 68 extending laterally through the forward end of the housing 60. The attachment bore 68 is sized to be pivotally attached to a rearwardly projecting attachment hub 70 integrally formed with the yoke 36 by a well known pin assembly 72.

The floating piston 62 is slidably received within the bore 66 of the housing 60. The floating piston 62 includes a piston head 74 and an elongate stem portion 76 integrally formed with one side of the piston head 74. The floating piston 62 is suitably formed from a high strength material, such as steel. The outside diameter of the piston head 74 is substantially equal to the diameter of the bore 66. The floating piston 62 also includes an O-ring 78 or other suitable seal seated within an annular channel 80 extending around the perimeter of the piston head 74. The O-ring 78 is sized to define a seal between the piston head 74 and the interior wall of the bore 66 when the floating piston 62 is slidably received therein. The other end of the floating piston 62 is slidably received within the main piston 64. The floating piston 62 also includes an O-ring 82 seated within an annular channel 84 extending around the perimeter of the stem portion 76 to define a seal between the stem portion 76 and the main piston 64.

The main piston 64 includes a main piston head 90 and an elongate stem portion 92 integrally formed with one side of the main piston head 90. The main piston 64 includes a centrally located bore 94 extending longitudinally through the main piston 64. The main piston bore 94 is sized to slidably receive the stem portion 76 of the floating piston 62 therein. Sliding motion of the main piston 64 relative to the floating piston 62 is limited by a well known stop fasteners, such as split bushings 96a and 96b and a threaded nut 98. The split bushings 96a and 96b act as a stop to prevent the main piston 64 from disconnecting from the floating piston 62. The nut 98 includes an externally threaded portion sized to be threadably received within an internally threaded portion (not shown) of the main piston head 90 to clamp the split bushings 96a and 96b within the main piston head 90.

The floating piston 62 and the main piston 64 are sealed within the housing 60 by a well known rod gland 100. The rod gland 100 is sized to be sealingly received within the bore 66 of the housing 60 and is fastened therein by a well known fastener, such as a shear ring 103 and retaining plate 102. The rod gland 100 is suitably formed from bronze and includes a centrally located bore (not shown) sized to sealingly receive the stem 94 of the main piston 64 therethrough. As assembled, the main piston 64 slides freely against the rod gland 100 in response to pivoting motion of the truck beam 26, as is described in greater detail below.

The main piston head 90 has a diameter substantially equal to the diameter of the bore 66 of the housing 60 to define first and second chambers 104 and 106 on opposite sides of the main piston head 90. The main piston head 90 includes a piston sealing ring 108 received within an annular channel 110 extending around the perimeter of the main piston head 90. The other end of the main piston 64 includes a bore 112 sized to be pivotably attached to the aft end of the truck beam 26 by a well known pin assembly 114.

Referring to FIG. 3, the damping mechanism 54 will now be described in greater detail. The damping mechanism 54 includes a housing 120, a plurality of one way spring biased relief valves 122a–122c, a spring biased check valve 123 and first and second damping orifice plates 124a and 124b. The housing 120 is suitably formed from a high strength material, such as steel, and is preferably integrally formed with the housing 60 of the truck positioner assembly 52. Although it is preferred that the damping mechanism 54 is integrally formed with the truck positioner assembly 52, other configurations, such as a separately formed truck positioner assembly and damping mechanism fastened together in a well known manner, are also within the scope of the present invention.

The damping mechanism housing 120 includes plurality of channels extending therein. Preferably, the damping mechanism 54 includes an inlet channel 126, a return channel 128, a main channel 130 and first and second relief channels 132a and 132b. The inlet and return channels 126 and 128 are in fluid communication with a hydraulic pump and reservoir (not shown) located elsewhere within the airplane by first and second hydraulic lines 134 and 136. The first hydraulic line 134 supplies high pressure hydraulic fluid from the reservoir to the truck positioner mechanism 20 by a pump (not shown) located elsewhere within the fuselage, as is well known in the art. The pressure could be 3000 psi, for example. The second hydraulic line 136 is in fluid communication with the hydraulic reservoir and provides a return path at low pressure for hydraulic fluid within the truck positioner mechanism 20 should the internal pressure of the mechanism 20 exceed a predetermined level, as is described in greater detail below.

The main channel 130 defines a substantially round path within the damping mechanism 54. One end of the main channel 130 is in fluid communication with the first chamber 104 by a first port 138. The other end of the main channel 130 is similarly in fluid communication with the second chamber 106 by a second port 140. Thus, as configured, the main channel 130 is in fluid communication with both the first and second chambers 104 and 106.

The inlet channel 126 extends downwardly from the upper end of the damping mechanism housing 120 and intersects the main channel 130 to place the inlet channel 126 into fluid communication with the main channel 130 between orifice plates 124a and 124b. Similarly, the return channel 128 extends laterally from the forward end of the damping mechanism housing 120 rearwardly to intersect the main channel 130, thereby placing the return and main channels 128 and 130 into fluid communication.

The first relief valve 122a is disposed within the return channel 128 in a manner well known in the art. The relief valve 122a permits one way fluid flow through the return channel 128, such that if the fluid pressure within the truck positioner mechanism 20 exceeds the cracking pressure of the relief valve 122a, the relief valve 122a opens. In the open position, hydraulic fluid exits the truck positioner mechanism 20 through the relief valve 122a and recycles back to the hydraulic fluid reservoir, thereby relieving the system pressure. As a nonlimiting example, the cracking pressure for the first check valve 122a may suitably be 4500 psi.

The check valve 123 is disposed in a manner well known in the art within the inlet channel 126 to provide one way directional fluid flow into the truck positioner mechanism 20. As a nonlimiting example, the check valve 123 may be a check valve having a low cracking pressure, such as 2–8 psi. The check valve 123 resupplies hydraulic fluid to the truck positioner mechanism 20 as necessary. Because the check valve 123 permits hydraulic fluid to flow only into the truck positioner mechanism 20, the valve prevents pressure surges from going up the first hydraulic line 134. Further, the check valve 123 resupplies the truck positioner mechanism 20 with hydraulic fluid that is cooler than that within the truck positioner mechanism 20. This pumping action assists in cooling the truck positioner mechanism 20 during use.

The first and second relief channels 132a and 132b extend laterally between the main channel 130, such that the first and second relief channels 132a and 132b are functional parallel to each other. Preferably, the second relief valve 122c is disposed within the first relief channel 132a to provide pressure relief from the second chamber 106. The second relief valve 122b has a high cracking pressure, such as 1900 psi. When the fluid pressure within the second chamber 106 exceeds a predetermined level, the relief valve 122b opens to permit hydraulic fluid to flow through the first relief channel 132a. Similarly, the third relief valve 122c is disposed within the second relief channel 132b, such that the third relief valve 122c provides pressure relief from the first chamber 104. In this arrangement, the third relief valve 122c is suitably a high pressure valve, such as a cracking pressure of 1100 psi, such that when the pressure within the first chamber 104 exceeds a predetermined level, the third relief valve 122c opens to permit fluid to flow through the second relief channel 132b.

As configured, the second and third relief valves 122b and 122c control fluid flow through the first and second relief channels 132a and 132b, respectively, such that the second relief valve 122b controls the pressure within the second chamber 106 and the third relief valve 122c controls the pressure level within the first chamber 104. The relief cracking pressures in the second and third relief valves 122*b* and 122*c* may be tailored to provide an equal maximum load in both directions of motion of piston 64. The maximum load in each direction is equal to the product of the cracking of pressure of each valve times the exposed surface area of the main piston head 90 adjacent each chamber. As a nonlimiting example, the load required to open the third relief valve 122*c* is equal to the cracking pressure of the third relief valve 122*c* times the exposed surface area of the main piston head 90 adjacent the first chamber 104. Similarly, the load required to open the second relief valve 122*b* is equal to the cracking pressure of the second relief valve 122*b* times the exposed surface area of the main piston head 90 adjacent the second chamber 106. Thus, by adjusting the cracking pressures of the second and third relief valves 122*b* and 122*c* relative to the exposed surface areas of the main piston head 90, the load required to unseat the second and third relief valves 122*c* and 122*d* may be selectively adjusted such that it is the same in both directions of the sliding motion of the main piston 64.

The first and second damping orifice plates 124*a* and 124*b* are suitably disposed within the main channel 130, such that they are positioned on opposite sides of the inlet channel 126. Each damping orifice plate 124*a* and 124*b* is suitably a round plate having a hole extending therethrough. Each plate may be removably seated within the main channel 130 by a well known fastener, such as a tapered pin or swage.

Each hole of each damping orifice plate 124*a* and 124*b* is sized to permit a predetermined fluid flow therethrough. Preferably, each hole is sized to permit a predetermined flow rate through the orifice plate, such that fluid passing from either the first or second chamber 104 and 106 passes through the orifice plates 124*a* and 124*b* which are chosen to maximize the damping benefit of the damping mechanism 54.

The damping benefit of the mechanism 20 comes from the energy that is dissipated by fluid being forced through orifices of the orifice plates 124*a* and 124*b*. To maximize the energy dissipated the size of the orifices can be selected according to the equation $c=k/[(x)(\alpha^2)]$. c is damping constant of combined orifices, given $F=cv^2$ where F=Force reacted by main piston 64 and V=Velocity of main piston 64. K is spring constant of damper, given $$K = \frac{\Delta F}{\Delta X}.$$

−F is change in force for a given −X change in displacement of main piston 64. α is circular frequency of oscillations of the truck beam 26, given $\alpha=2\Xi F$ and F=driving frequency of truck beam 26. X is ½ amplitude of input displacement of main piston 64.

Operation of the truck positioner mechanism 20 may be best understood by referring to FIGS. 2 and 3. As noted above, the main piston 64 is slidably received within the bore 66 of the mechanism 20. When the airplane is traversing a rough runway surface, it causes the truck beam 26 to pivot about the pivot joint assembly 50 at a relatively high rate. Because the main piston 64 is pivotally attached to one end of the truck beam 26, as the pivot beam 26 pivots about the pivot joint assembly 50, it causes the main piston 64 to reciprocally slide within the truck positioner housing 60 in the direction indicated by the arrow 142.

As the main piston 64 slides into the truck positioner housing 60, the forward end of the main piston head 90 compresses the hydraulic fluid within the first chamber 104. As a result, fluid is forced upwardly through the first port 138 and into the main channel 130. Within the main channel 130, the hydraulic fluid is driven upwardly through the holes in first and second orifice plates 124*a* and 124*b* and back into the second chamber 106 through the second port 140. As a result, when the landing gear assembly 22 encounters multiple small displacements, such as traversing a rough runway, the pivoting motion of the truck beam 26 is dampened by the fluid flow through the damping mechanism 54.

When a larger displacement load is encountered, such as striking a large bump in the runway, such loads may cause the fluid pressure within the truck positioner mechanism 20 to exceed the cracking pressure of any one of the relief valves 122*a*–122*c* due to the rapid motion, in or out, of the main piston 64. As a nonlimiting example, if the main piston 64 is back driven within the bore 66 at a rate that causes the fluid pressure to exceed the cracking pressure of the third relief valve 122*c*, hydraulic fluid is permitted to flow not only through the main channel 130, but also through the second relief channel 132*b*. In certain other conditions where a very high force is encountered, such as rotation of the airplane during take off and landing, such loads result in a large displacement of the pivot beam 26 thereby causing the pressure within the main channel 130 to exceed the cracking pressure of the relief valve 122*a*. As a result, hydraulic fluid is permitted to pass through the return channel 128 and is returned back to the reservoir.

The exposed surface of each side of the piston head 90 is not equal. The side adjacent chamber 104 is larger than that of the side adjacent chamber 106. Because of this unbalance, as the main piston 64 is driven in, not all of the fluid can be transferred chamber 106. The residual is expelled through relief valve 122*a*. On the reverse (extension) stroke, make-up fluid is required to fill the larger chamber 104. This fluid enters through the supply check valve 123. This constant pumping action circulates fresh, cool fluid through the damping mechanism 54.

For linear displacements ending the main piston 64, hydraulic fluid in the second chamber 106 is compressed by the rearwardly facing surface of the main piston head 90. As a result, hydraulic fluid passes upwardly through the second port 140 and into the main channel 130. In low amplitude displacements, hydraulic fluid flows through the holes in the first and second orifice plates 124*a* and 124*b*, where it is received into the expanding first chamber 104. In the event a high force load or displacement is encountered, hydraulic fluid is permitted to flow through the first relief channel 132*a* if the cracking pressure of the second relief valve 122*b* is exceeded, as described above for the third relief valve 122*c*. In still other extreme operating conditions where a very large load is encountered, hydraulic fluid is permitted to exhaust outwardly through the return channel 128.

During conditions where hydraulic fluid is permitted to exit through the return channel 128, additional hydraulic fluid from the hydraulic pump is permitted to flow into the damping mechanism 54 through the inlet channel 126. As a result, supply fluid replenishes the hydraulic fluid within the truck positioner mechanism 20 with hydraulic fluid having a lower temperature than fluid located within the truck positioner mechanism 20. This cooler fluid lowers the overall temperature of the hydraulic fluid within the system, thereby lowering the overall temperature of the truck positioner mechanism 20.

The truck positioner mechanism 20 also operates as a truck positioner of the truck beam 26 after the airplane lifts off the ground. When the airplane rotates off the ground and becomes airborne, the pressure in chamber 104 acts to extend piston 64. The main piston 64 continues to extend until the split bushings 96a and 96b are seated against an annular portion extending around the perimeter of the stem 76 of the floating piston 62, as is well known in the art. The floating piston 62 is held within the truck positioner or housing 60 by the system fluid pressure within the truck positioner mechanism 20, as is also well known in the art.

The previously described version of the present invention provides several advantages over currently available truck positioners. First, the damping orifice plates preload both the first and second chambers to a nominal system pressure. This causes both volumes of fluid on either side of the main piston head to act like preloaded springs when the piston is back driven to react oscillations of the truck beam. Preloading both chambers 104 and 106 doubles the stiffness of the damper as compared to current designs operating at low pressures. Further, because the mechanism is designed to resupply hydraulic fluid when the main piston reciprocates within the housing, the pumping action acts to cool the mechanism. Additionally, the check valve located in the inlet channel prevents pressure surges from going up the supply hydraulic line. Finally, such a mechanism may be fastened to existing structural arrangements of current landing gear assemblies, thereby eliminating the need for modifications to attach the truck positioner mechanism to landing gear. As a result, such a mechanism may be easily incorporated on both new and existing landing gear assemblies. Thus, a combined damper and truck positioner mechanism formed in accordance with the present invention is economical, extends the useful life of landing gear assemblies, and does not require alteration of existing structural arrangements of current landing gear assemblies.

From the foregoing description, it can be seen that a combined damper and truck positioner assembly formed in accordance with the present invention incorporates many novel features and offers significant advantages over currently available truck positioner mechanisms. As a first nonlimiting example, more or less channels may be formed within the damping mechanism. As a second nonlimiting example, the damping orifice plates may be replaced by sizing the channel to the desired diameter. As a third non-limiting example, the damper could be mounted on either front or back end of truck beam. Thus, it is to be understood that within the scope of the claims various changes can be made therein without departing from the spirit of the invention.

The embodiments of the invention in which an exclusive property or privilege is claimed are defined as follows:

1. A combined hydraulic damper and truck positioner mechanism for a landing gear of an airplane, the landing gear being swingingly attached to the airplane for reciprocating movement of the landing gear between an extended position and a retracted position, the landing gear including an elongate main strut having one end swingingly attached to the airplane and a longitudinally spaced second end, the landing gear further including a truck beam assembly pivotably attached to the strut second end, the truck beam assembly having at least two wheels journaled thereto, the combined hydraulic damper and truck positioner mechanism comprising:

(a) a housing having one end adapted to be fastened to the strut and a second end, the housing having an interior bore with a predetermined cross-sectional area;
   (b) at least a first piston having a first piston head end and a longitudinally spaced second end adapted to be fastened to the truck beam assembly, the piston head being slidably received within the bore to form first and second chambers within the housing and for sliding movement of the piston in response to pivoting movement of the truck beam assembly when the piston second end is attached to the truck beam assembly;
   (c) a damping assembly in fluid communication with the housing, the damping assembly maintaining a substantially constant fluid pressure within the housing to maintain high stiffness and to dampen loads associated with the sliding movement of the piston when the landing gear is in the extended position; and
   (d) a preload assembly in fluid communication with the housing, the preload assembly preloading the first and second chambers to a predetermined fluid pressure.

2. The combined hydraulic damper and truck positioner mechanism of claim 1, wherein the piston head having a cross-sectional area substantially equal to the cross-sectional area of the bore to define first and second chambers on opposite sides of the piston head.

3. The combined hydraulic damper and truck positioner mechanism of claim 2, wherein the damping assembly further comprises a first channel in fluid communication with the first chamber and a second channel in fluid communication with the second chamber, the first and second channels being in fluid communication with the first and second chambers to dampen sliding motion of the piston within the housing by selectively maintaining a predetermined fluid pressure within the first and second chambers.

4. The combined hydraulic damper and truck positioner mechanism of claim 3, wherein the damping assembly further comprises a first one way relief valve in fluid communication with the first channel and a second one way relief valve in fluid communication with the second channel, the first and second relief valves providing an equal damping force in opposite directions through the damping assembly.

5. The combined hydraulic damper and truck positioner mechanism of claim 2, wherein the preload assembly further comprising a pair of damping orifices disposed between the first and second chambers, each damping orifice being sized to preload both the first and second chambers to a predetermined fluid pressure.

6. The combined hydraulic damper and truck positioner mechanism of claim 5, further comprising a hydraulic fluid supply port disposed between the first and second orifices.

7. A combined hydraulic damper and truck positioner mechanism for a landing gear of an airplane, the landing gear being swingingly attached to the airplane for reciprocating movement of the landing gear between an extended position and a retracted position, the landing gear including an elongate main strut having one end swingingly attached to the airplane and a longitudinally spaced second end, the landing gear further including a truck beam assembly pivotably attached to the strut second end, the truck beam assembly having at least two wheels journaled thereto, the combined hydraulic damper and truck positioner mechanism comprising:

(a) a housing having one end adapted to be fastened to the strut and a second end, the housing having an interior bore with a predetermined cross-sectional area;
   (b) at least a first piston having a first piston head end and a longitudinally spaced second end adapted to be fastened to the truck beam assembly, the piston head being slidably received within the bore for sliding movement of the piston in response to pivoting movement of the truck beam assembly when the piston second end is fastened to the truck beam assembly, the piston head having a cross-sectional area substantially equal to the cross-sectional area of the bore to define first and second chambers on opposite sides of the piston head; and (c) a damping mechanism in fluid communication with the first and second chambers of the housing, the damping mechanism maintaining a substantially constant fluid pressure within both chambers to maintain high stiffness and to dampen loads associated with sliding movement of the piston when the landing gear is in the extended position, wherein the damping mechanism preloads both the first and second chambers to a predetermined fluid pressure.

8. The combined hydraulic damper and truck positioner mechanism of claim 7, wherein the damping mechanism further comprises a first channel in fluid communication with the first chamber and a second channel in fluid communication with the second chamber, the first and second channels being in fluid communication with the first and second chambers to dampen sliding motion of the piston within the housing by selectively maintaining the fluid pressure within the first and second chambers.

9. The combined hydraulic damper and truck positioner mechanism of claim 8, wherein the damping mechanism further comprises a first one way relief valve in fluid communication with the first channel and a second one way relief valve in fluid communication with the second channel, the first and second relief valves providing an equal damping force in opposite directions through the damping mechanism.

10. The combined hydraulic damper and truck positioner mechanism of claim 9, further comprising a pair of damping orifices disposed between the first and second chambers, each damping orifice being sized to preload both the first and second chambers to a predetermined fluid pressure.

11. The combined hydraulic damper and truck positioner mechanism of claim 10, further comprising a hydraulic fluid supply port disposed between the first and second orifices.

12. A combined hydraulic damper and truck positioner mechanism for a landing gear of an airplane, the landing gear being swingingly attached to the airplane for reciprocating movement of the landing gear between an extended position and a retracted position, the landing gear including an elongate main strut having one end swingingly attached to the airplane and a longitudinally spaced second end, the landing gear further including a truck beam assembly pivotably attached to the strut second end, the truck beam assembly having at least two wheels journaled thereto, the combined hydraulic damper and truck positioner mechanism comprising:

(a) a cylindrical housing having one end adapted to be pinned to the strut and a longitudinally spaced second end, the housing having an interior bore with a predetermined cross-sectional area;

(b) a floating piston having a large cylinder end and a longitudinally spaced second end, the floating piston being slidably received within the bore;

(c) a main piston having a first piston head end slidably fastened to the floating piston second end and a longitudinally spaced second end adapted to be fastened to the truck beam assembly, the piston head being slidably received within the bore for sliding movement of the piston in response to pivoting movement of the truck beam assembly when the main piston second end is fastened to the truck beam assembly, the piston head having a cross-sectional area substantially equal to the cross-sectional area of the bore to define a seal therebetween and to define first and second chambers on opposite sides of the piston head; and (d) a dual direction damping mechanism in fluid communication with the first and second chambers of the housing, the dual direction damping mechanism maintaining a substantially constant fluid pressure within both chambers to maintain high stiffness and to dampen loads associated with sliding movement of the piston when the landing gear is in the extended position, wherein the dual direction damping mechanism preloads the first and second chambers to a predetermined fluid pressure.

13. The combined hydraulic damper and truck positioner mechanism of claim 12, wherein the damping mechanism further comprises a first channel in fluid communication with the first chamber and a second channel in fluid communication with the second chamber, the first and second channels being in fluid communication with the first and second chambers to dampen sliding motion of the piston within the housing by selectively maintaining the fluid pressure within the first and second chambers.

14. The combined hydraulic damper and truck positioner mechanism of claim 13, wherein the damping mechanism further comprises a first one way relief valve in fluid communication with the first channel and a second one way relief valve in fluid communication with the second channel, the first and second relief valves providing an equal damping force in opposite directions through the damping mechanism.

15. The combined hydraulic damper and truck positioner mechanism of claim 14, further comprising a pair of damping orifices between the first and second chambers, each damping orifice being sized to preload both the first and second chambers to a predetermined fluid pressure.

16. The combined hydraulic damper and truck positioner mechanism of claim 15, further comprising a hydraulic fluid supply port disposed between the first and second orifices.

* * * * *